United States Patent
Zhou et al.

[11] Patent Number: 5,930,031
[45] Date of Patent: Jul. 27, 1999

[54] MONOLITHICALLY INTEGRATED SIGNAL PROCESSING CIRCUIT HAVING ACTIVE AND PASSIVE COMPONENTS

[75] Inventors: Weimin Zhou, Eatontown, N.J.; Paul H. Shen, North Potomac; Mitra Dutta, Silver Spring, both of Md.; Jagadeesh Pamulapati, Eatontown, N.J.

[73] Assignee: The United States of America as represented by the Secretary of the Army, Washington, D.C.

[21] Appl. No.: 09/061,358

[22] Filed: Apr. 8, 1998

Related U.S. Application Data

[62] Division of application No. 08/709,997, Sep. 9, 1996, Pat. No. 5,770,472.

[51] Int. Cl.$^6$ ............................ G02B 6/12; H01S 3/18; H01L 21/70
[52] U.S. Cl. ..................... 359/344; 359/183; 359/188; 385/3
[58] Field of Search ......................... 359/161, 183, 359/187, 188, 194, 195, 344, 349; 385/3, 9, 130

[56] References Cited

U.S. PATENT DOCUMENTS

| | | | |
|---|---|---|---|
| 4,826,282 | 5/1989 | Alferness | 385/130 |
| 5,122,852 | 6/1992 | Chan et al. | 385/130 |
| 5,127,081 | 6/1992 | Koren et al. | 385/130 |
| 5,237,639 | 8/1993 | Kato et al. | 385/130 |
| 5,770,472 | 6/1998 | Zhou et al. | 438/24 |

OTHER PUBLICATIONS

Zhou et al. Proc. SPIE, vol. 3491, Jul. 29, 1998; pp. 410–413.
Pamulepati, S. et al, Appl. Phys. Lett., vol. 56, #2, pp. 103–104, Jan. 8, 1990.

*Primary Examiner*—Nelson Moskowitz
*Attorney, Agent, or Firm*—Michael Zelenka; John M. O'Meara

[57] ABSTRACT

An optical signal processor is implemented as a monolithically integrated semiconductor structure having optical waveguide devices forming beam splitters, optical amplifiers and optical phase shifters. The monolithic structure photonically controls a phased-array microwave antenna. Phase-locked master and slave lasers generate orthogonal light beams having a difference frequency that corresponds to the microwave carrier frequency of the phased-array antenna. The lasers feed the signal processor, which performs beam splitting, optical amplifying and phase shifting functions. A polarizer and an array of diode detectors convert optical output signals from the signal processor into microwave signals that feed the phased-array antenna. The optical waveguides of the signal processor are fabricated in a single selective epitaxial growth step on a semiconductor substrate.

9 Claims, 3 Drawing Sheets

MONOLITHICALLY INTEGRATED SIGNAL PROCESSING CIRCUIT HAVING ACTIVE AND PASSIVE COMPONENTS

This is a Divisional Application of application Ser. No. 08/709,997 which was filed Sep. 9, 1996 and issued as U.S. Pat. No. 5,770,472.

GOVERNMENT INTEREST

The invention described herein may be manufactured, used, sold, imported and licensed by or for the Government of the United States of America without the payment to us of any royalty thereon.

FIELD OF THE INVENTION

This invention relates generally to the field of microelectronics and more particularly to the monolithic integration of opto-electronic signal processing structures for use in photonic systems.

BACKGROUND OF THE INVENTION

In recent years, artisans have made significant advances in fabricating and using opto-electronic integrated circuits. These improved circuits, which often contain passive and active optical devices, have found significant applications in a number of fields including optical computing and communications. The use of opto-electronic circuits in many systems can result in significant cost savings, increased circuit speeds, reduced physical size and power requirements, increased reliability, as well as other improvements. As such, those concerned with the development of photonic systems in such fields as radar, communications and computing have recognized the need for improved techniques of constructing opto-electronic circuits.

Specifically, conventional phased-array antenna systems have been successfully demonstrated for transmitting and receiving microwave energy in communication and radar systems. A phased-array antenna is an antenna with two or more driven elements. The elements are fed with a certain relative phase, and they are spaced at a certain distance, resulting in a directivity pattern or beam that exhibits gain in some directions and little or no radiation in other directions. Although phased arrays may have fixed beams, they usually contain rotatable or steerable beams. Of course, an antenna structure may be physically moved to effect beam steering, however, in a phased-array antenna, beam steering is usually accomplished by simply varying the relative signal phase being fed to the antenna elements.

Although prior art phased-array antennas have served the purpose, they have not proved entirely satisfactory for use in many microwave communication and/or radar systems. To obtain sufficient radar resolution, phased-array antennas employed with some microwave radars require that as many as a thousand antenna elements be arrayed to produce a sufficiently narrow beam. Since many long-range communication systems also require narrow antenna beams, they often have antenna arrays with hundreds of antenna elements. While the size of microwave antenna arrays having several hundred or even a thousand antenna elements can be relatively small, the signal processing circuits connected to these antenna arrays often become prohibitively large and expensive to manufacture. Thus, artisans have recognized the need for reducing the size and cost of many signal processing circuits by using an optically controlled microwave system.

SUMMARY OF THE INVENTION

A general purpose of this invention is to provide a technique of fabricating a monolithically integrated circuit by growing a network of interconnected active and passive optical waveguide devices on a substrate in a single selective epitaxial growth step.

A specific aspect of the invention comprises an optical signal processor for optical phase distribution and microwave beam forming. A network of interconnected optical waveguide devices are built on a semiconductor substrate. The optical waveguide devices comprise optical beam splitters, optical amplifiers and optical phase shifters. A gain control circuit connects to the optical amplifiers for amplifying optical energy propagating through the optical amplifiers. A phase-shift control circuit connects to the phase shifters for controlling the relative phases of two optical beams with orthogonal polarization.

A more specific aspect of the present invention comprises a microwave system having a photonically controlled phased-array microwave/millimeter wave antenna. The system comprises an optical signal processor formed from a monolithically integrated semiconductor structure having a network of interconnected waveguide devices. The waveguide network includes optical beam splitters, optical amplifiers and optical phase shifters. Phase-locked master and slave lasers generate two orthogonal light beams having a difference frequency that corresponds to the microwave/millimeter wave carrier frequency of the phased-array antenna. The lasers feed the optical signal processor which performs beam splitting, optical amplifying and phase shifting functions. The optical signal processor has a plurality of optical outputs equal in number to the number of antenna elements. A polarizer at the outputs and an array of optical fibers transmit these optical outputs to diode detectors that generate microwave signals which feed the phased-array antenna. The optical waveguides are fabricated in a single selective epitaxial growth step on a semiconductor substrate.

The exact nature of this invention, as well as other objects and advantages thereof, will be readily apparent from consideration of the following specification relating to the annexed drawings.

DETAILED DESCRIPTION OF THE PREFERRED EMBODIMENTS

Figure 1:
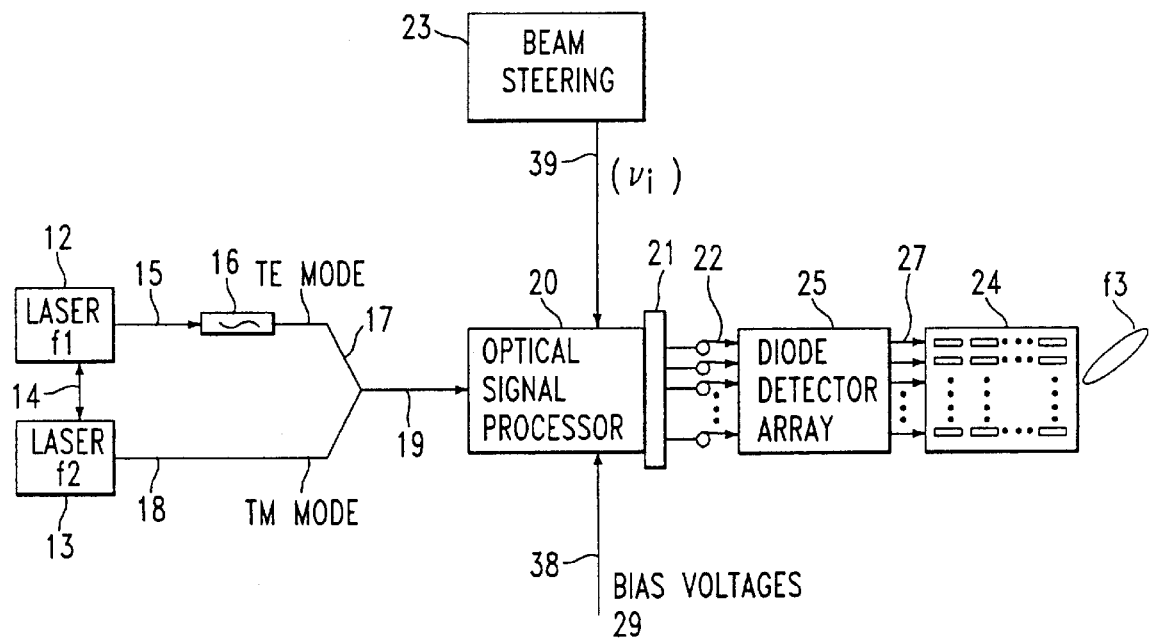
FIG. 1 is a schematic block diagram of a microwave system having a photonically controlled phased-array antenna in accordance with the present invention.

Referring now to the drawings, FIG. 1 depicts photonic microwave system 11 for transmitting and/or receiving microwave/millimeter wave radiation at frequency f3 via a photonically controlled phased-array antenna system. Microwave system 11 comprises conventional master laser 12 and slave laser 13 perpendicularly polarized and phase-locked to each other via line 14. Master laser 12 generates light at frequency f1 while slave laser 13 generates light at frequency f2. Light frequencies f1 and f2 are chosen such that their difference, (f1−f2), corresponds to the carrier frequency f3 of microwave system 11. Master laser 12 launches a light beam in the TE mode onto optical waveguide 15, which transmits the light beam to a conventional optical modulator 16. Modulator 16 impresses information onto the light beam by, for example, pulse modulation. As such, modulator 16 passes the modulated light beam, e.g., pulses of light having carrier frequency f1 and polarized in the TE mode, onto optical waveguide 17. Synchronously with laser 12, laser 13 launches a light beam having frequency f2 and polarized in the TM mode onto optical waveguide 18. Consequently, the outputs of waveguides 17 and 18 simultaneously feed two phase-related orthogonal light beams to optical waveguide 19. These orthogonal light beams form an input to optical signal processor 20.

With further reference to FIG. 1, optical signal processor 20 splits the perpendicularly polarized light beams input by waveguide 19 into a number of channels, amplifies the light intensity in each channel and phase shifts the light in each channel. Beam steering circuit 23, which inputs beam steering voltages ($v_i$) via bus 39 to optical signal processor 20, functions to vary the amount of phase shift in each of the channels i, where i represents an arbitrary channel. A conventional optical polarizer 21, polarized at a 45-degree angle with respect to the polarization of the orthogonal light beams, mounts at the output of optical signal processor 20. Polarizer 21 extracts and combines 45-degree light components from each channel. Thus, polarizer 21 produces polarized light containing the sum and difference frequencies f4 and f3, where f1+f2=f4 and f1−f2=f3, as well as frequencies f1 and f2. An array of optical fibers 22, one fiber for each channel, transmits light energy from the output of polarizer 21 to an array of optical diode detectors 25, each of which oscillate at frequency f3, i.e., the difference frequency (f1−f2), which corresponds to the carrier frequency f3 of phased-array antenna 24. The respective output lines 27 of diode detectors 25 feed different ones of the specifically spaced antenna elements of phased-array antenna 24 with microwave signals at carrier frequency f3 but with different relative phase angles.

Figure 2:
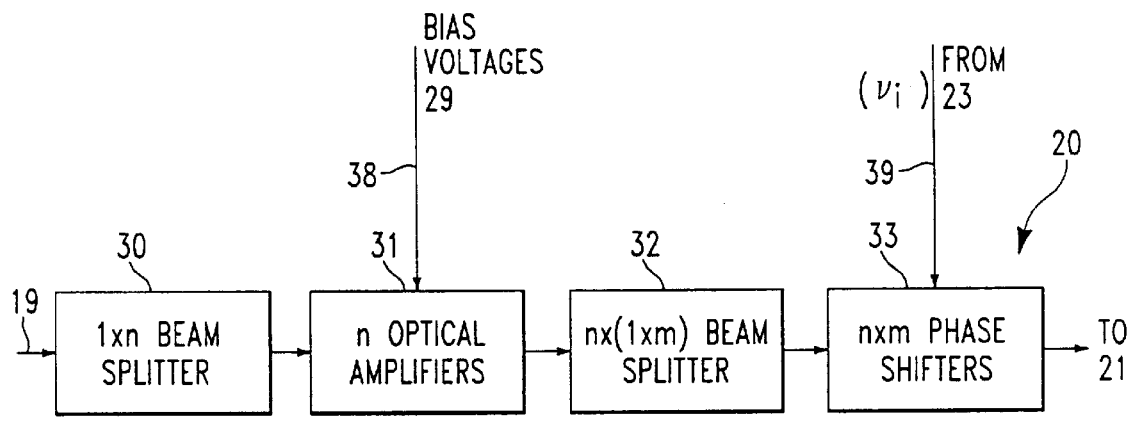
FIG. 2 is a schematic block diagram of an optical signal processor circuit for use in the system of FIG. 1.

As mentioned above, optical signal processor 20 performs beam splitting, amplifying and phase shifting functions. FIG. 2 depicts a functional block diagram of optical signal processor 20, which is designed to generate (n×m) output signals that feed the (n×m) antenna elements of phased-array antenna 24. The input stage of optical signal processor 20 includes a (1×n) beam splitter 30, which feeds n polarization-dependent, light-intensity amplifiers 31. Input bias voltages 29 control amplifiers 31 via bus 38. The n outputs of amplifiers 31 connect to an n(1×m) beam splitter 32, which in turn feeds an array of (n×m) polarization-selective, phase shifters 33. Beam steering voltages ($v_i$) from beam steering circuit 23 control phase shifters 33 via bus 39. The (n×m) outputs of phase shifters 33 pass to polarizer 21 (see FIG. 1). For a typical microwave phased-array antenna having 256 antenna elements, the values of n and m may each be equal to sixteen. Of course, phased-array antennas having other numbers of elements and other combinations of n and m are of equal importance and will become obvious to those skilled in these arts.

Figure 3:
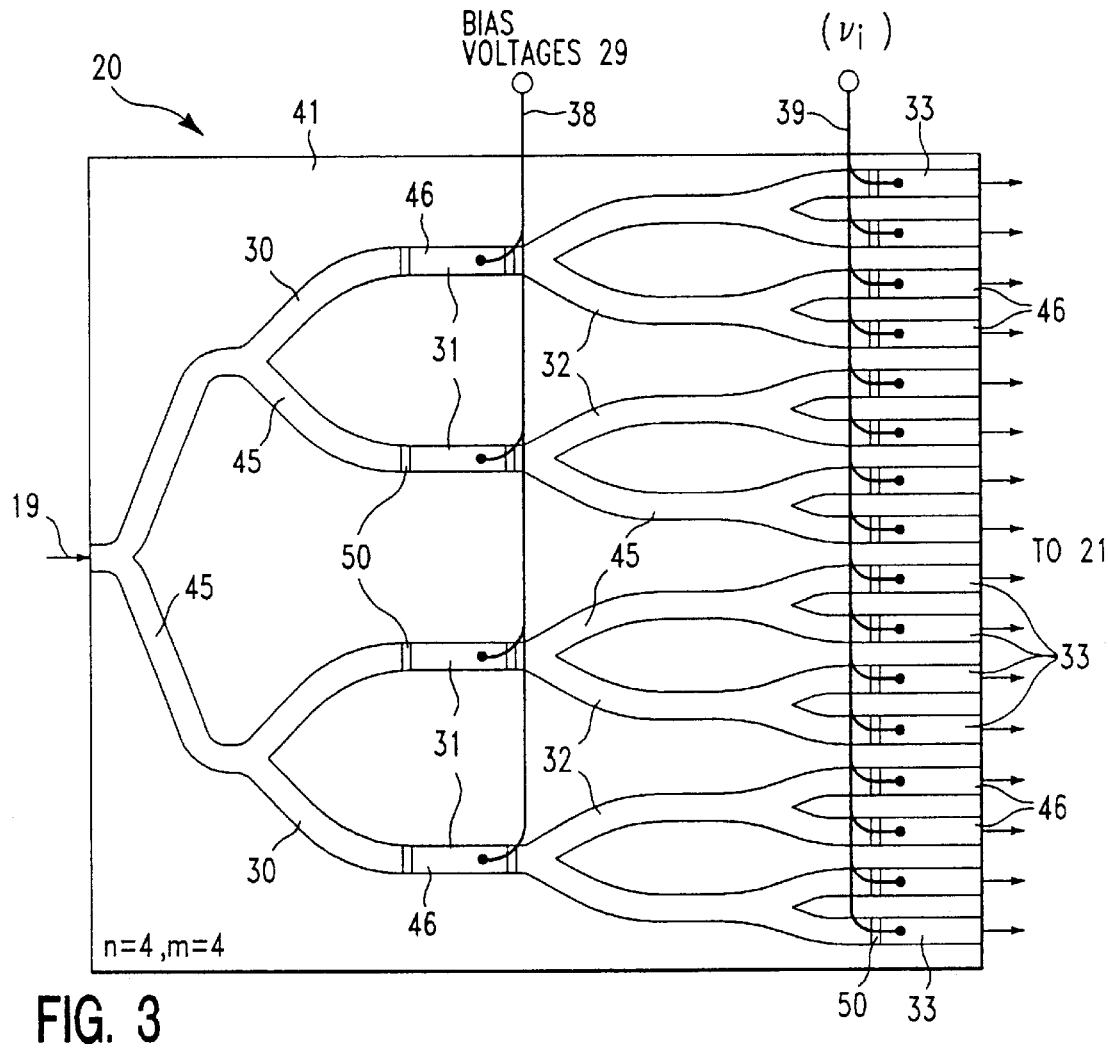
FIG. 3 is a schematic diagram showing a top plan view of the FIG. 2 circuit implemented as a monolithically integrated semiconductor structure having a network of interconnected optical waveguide devices.

FIG. 3 is a schematic drawing of an illustrative optical signal processor 20 where, for simplicity, the values of n and m both equal four. Consequently, FIG. 3 shows a single input channel and sixteen output channels. Optical signal processor 20 is implemented as a monolithically integrated semiconductor structure comprising a network of optical waveguide devices which function as beam splitters 30 and 32, optical amplifiers 31 and optical phase shifters 33. Beam splitter 30 comprises a series of passive optical waveguides connected in a tree configuration and fed by optical waveguide 19. The input waveguide of beam splitter 30 branches into two waveguides that continue to branch in like fashion, forming four output waveguides that feed four polarization-dependent, light-intensity amplifiers 31. Amplifiers 31 are waveguide devices that amplify light energy as it propagates through the amplifiers. Bias voltages 29 control the gain of amplifiers 31.

Beam splitter 32, functionally similar to beam splitter 30, connects to the outputs of optical amplifiers 31. Beam splitter 32 comprises passive optical waveguides in a tree configuration that grows from four input channels to sixteen channels. Thus, beam splitter 32 splits the four amplified light beams output by amplifiers 31 into sixteen similar light beams, each of which comprise in-phase orthogonal light beams having respective frequencies f1 and f2.

Finally, the sixteen output channels of beam splitter 32 each connect to a different one of the sixteen phase-shifters 33. Beam steering circuit 23 (see FIG. 1) transmits a set of sixteen beam steering voltages ($v_i$) to phase shifters 33 via bus 39. Beam steering voltages ($v_i$) selectively phase shift each of the light beams propagating through phase-shifters 33 such that the relative phases of the sixteen outputs of optical signal processor 20 produce a beam pattern having the appropriate directivity at phased-array antenna 24 (see FIG. 1).

In particular, at the inputs to phase shifters 33, the light beams polarized in the TE mode, i.e., at frequency f1, may be expressed as $A=A_0 \sin(\omega_1 t+\phi_1)$; likewise, the light beams polarized in the TM mode, i.e., at frequency f2, may be expressed as $B=B_0 \sin(\omega_2 t+\phi_2)$. In these expressions, A and B represent the light intensity at frequencies f1 and f2, respectively, ω represents angular velocity, t represents time and ø represents the initial phase angles. Phase shifters 33, being polarization sensitive, will, in general, phase shift the perpendicularly polarized beams differently. Applied voltage ($v_i$) shifts light polarized in the TE mode in channel i a greater amount than light polarized in the TM mode in channel i. The following expression describes the phase shift of light polarized in the TE mode in channel i:

$$A_i = A_0 \sin[\omega_1 t+\phi_1+\alpha_1(v_i)]_i, \quad (1)$$

where $\alpha_1(v_i)$ represents the phase-shift angle due to beam steering voltage ($v_i$), and subscript i identifies the particular channel. Likewise, beam steering voltage ($v_i$) phase shifts light polarized in the TM mode, i.e., at frequency f2, in channel i as follows:

$$B_i = B_0 \sin[\omega_2 t+\phi_2+\alpha_2(v_i)]_i, \quad (2)$$

where $a_2(v_i)$ represents the phase-shift angle for frequency f2 due to voltage ($v_i$) from beam steering circuit 23. Due to the polarization sensitivity of phase shifters 33, $\alpha_1(v_i)$ will generally be different from and much greater than $\alpha_2(v_i)$. When polarizer 21 and diode detector 25 combine light beams $A_i$ and $B_i$, an output signal having a difference frequency is generated in the classical manner. In particular, the output signal from diode detector 25 has a component at the difference frequency, which may be expressed as follows:

$$K \cos [(\omega_1-\omega_2)t+\emptyset_1-\emptyset_2+\alpha_1(v_i)-\alpha_2(v_i)] \qquad (3)$$

where K is a constant. Expression (3) corresponds to the light energy in channel i at the difference frequency (f1−f2), which equals frequency f3 and corresponds to the output of detectors 25 and the microwave carrier frequency of phased-array antenna 24.

In expression (3), the term $[\emptyset_1-\emptyset_2+\alpha_1(v_i)-\alpha_2(v_i)]$ represents the phase angle for light energy in channel i at the difference frequency f3 after being shifted by beam steering voltage ($v_i$). Since lasers 12 and 13 are phase locked, $\emptyset_1$ and $\emptyset_2$ are substantially equal, making their difference, ($\emptyset_1-\emptyset_2$), nearly equal to zero. Also, since $\alpha_1(v_i)$ and $\alpha_2(v_i)$ are generally different and $\alpha_1(v_i)$ can be made very large compared to $\alpha_2(v_i)$, beam steering voltage ($v_i$) can produce arbitrarily large phase shifts in the resulting phase angle $[\emptyset_1-\emptyset_2+\alpha_1(v_i)-\alpha_2(v_i)]$.

Output signals from diode detectors 25 feed corresponding antenna elements of phased-array antenna 24. Due to the various phase shifts, $[\alpha_1(v_i)-\alpha_2(v_i)]$, in each of the sixteen channels, phased-array antenna 24 radiates at microwave carrier frequency f3 with a directivity pattern or beam that can be steered by beam steering voltages ($v_i$), where i ranges from one to sixteen.

Figure 4:
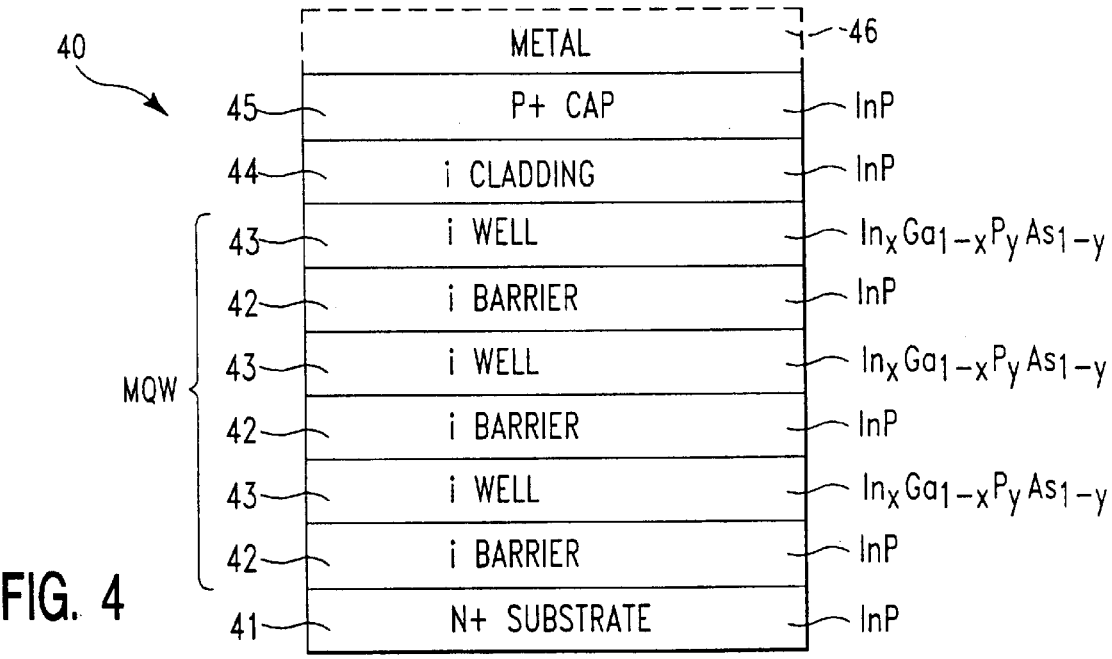
FIG. 4 is a schematic elevation showing a cross section of semiconductor layers used to fabricate the network of optical waveguide devices of FIG. 3.

As mentioned above, optical signal processor 20 is formed as a monolithically integrated semiconductor device. FIG. 4 schematically details representative materials that may be used to construct the components of optical signal processor 20. As seen in FIG. 4, the components of optical signal processor 20 are waveguide devices containing the layers of a PIN diode. In particular, the components of optical signal processor 20 comprise layered structure 40 formed from semiconductor heterostructures epitaxially grown on n-type substrate 41, which functions as one of the PIN diode terminals. Using substrate 41 as a bottom cladding layer, a fabricator grows a few periods of a multiple quantum well (MQW). The MQW includes a series of un-doped barrier and well layers 42 and 43, respectively. In a well known manner and before growing layers 42 and 43, the fabricator may first improve the quality of the upper surface of substrate 41 by covering it with an un-doped buffer layer (not shown). Layered structure 40, in the FIG. 4 illustrative example, comprises a three-period MQW. When tailoring a particular layered structure 40, skilled fabricators will appreciate that the number of MQW periods will depend on their particular application; one to 20 MQW periods would probably be suitable for most applications.

Next, the fabricator grows an un-doped top cladding layer 44 on the upper well layer 43. The fabricator then grows p-type cap layer 45 on cladding layer 44. Metal layer 46 is then deposited on cap layer 45. Metal layer 46, which functions as a PIN diode terminal, is shown in dashed lines in FIG. 4 to represent that not all of the waveguide devices contain this layer. In particular and as shown in FIG. 3, only the active waveguide devices, i.e., amplifiers 31 and phase shifters 33, which have bias voltages applied thereto, include metal layers 46. Finally, to electrically isolate the biased devices, amplifiers 31 and phase shifters 33, from the passive beam splitters 30 and 32, the fabricator etches narrow groves 50 (see FIG. 3) in p-type cap layer 45 at the boundaries where the biased devices meet the passive devices.

Layered structure 40 is preferably formed as an indium-phosphorus (InP) based structure. More particularly and as shown in FIG. 4, layered structure 40 includes the following semiconductor layers: n-doped indium-phosphorus (InP N+) substrate 41; un-doped InP barrier layers 42; un-doped indium-gallium-phosphate-arsenide ($In_xGa_{1-x}P_yAs_{1-y}$) well layers 43; un-doped InP top cladding layer 44; and p-type InP cap layer 45.

The waveguide devices of signal processor 20 are preferably fabricated by selective epitaxial growth using metal organic chemical vapor deposition (MOCVD), or metal organic vapor phase epitaxy (MOVPE), or gas source molecular beam epitaxy (MBE). The fabrication process of the present invention permits the fabricator in a single selective epitaxial growth step to tailor the band gaps and the strain of the various waveguide devices of signal processor 20. In particular, for signal processor 20 to function in the intended manner, those waveguide sections that function as amplifiers 31 must have a band gap that is smaller than the energy of the light to be amplified, those waveguide sections that function as phase shifters 33 must have a band gap that is greater than the light energy and must have sufficient strain to increase polarization dependence, and those waveguide sections that function as beam splitters 30 and 32 must have a band gap that is much greater than the light energy. In accordance with the present invention, waveguide devices with the appropriate band-gap spacing can be fabricated in a single selective epitaxial growth step.

Figure 5:
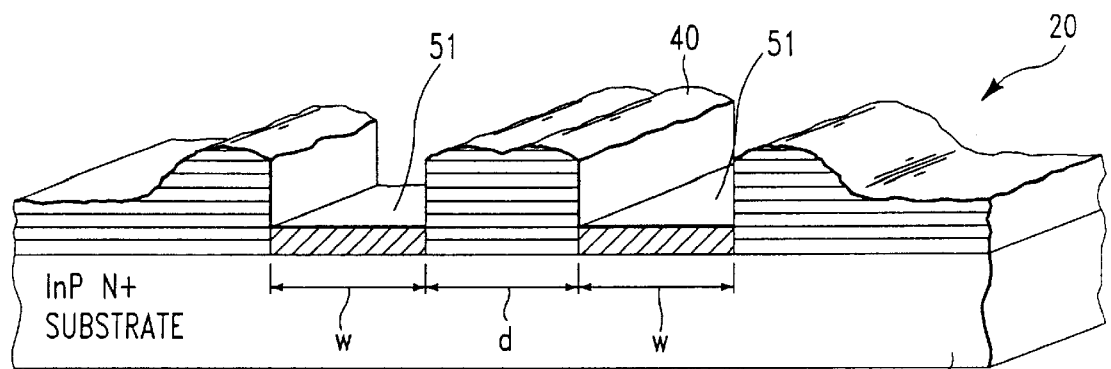
FIG. 5 is a pictorial break-away schematic in cross section illustrating the fabrication process used to construct the optical waveguide devices shown in FIG. 3.
Figure 6:
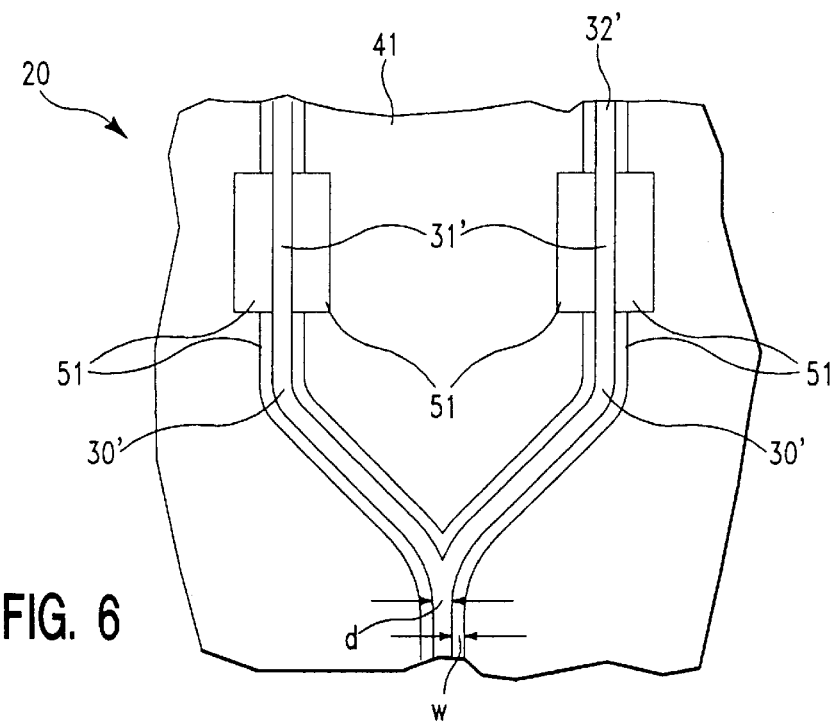
FIG. 6 is a top plan view in schematic illustrating an intermediate step of the fabrication process used to construct the optical waveguide devices shown in FIG. 3.

FIGS. 5–8 show structures and graphs useful in understanding the fabrication process of the present invention. The selective epitaxial growth process of the present invention involves the use of two parallel masking strips 51, preferably formed from silicon-dioxide ($SiO_2$), selectively placed on substrate 41 to define a gap, of uniform width (d), in the shape of the waveguide devices of signal processor 20 (see FIGS. 3, 5 and 6). As illustrated in FIG. 6, masking strips 51 have widths (w) that vary with the nature of the component being grown.

FIG. 6 illustrates a set of parallel masking strips 51 placed on substrate 41 in a Y-shaped configuration with a 31 gap of uniform width (d). Gap 31' of FIG. 6 defines a Y-shaped region on substrate 41 on which a corresponding Y-shaped portion of beam splitter 30 will be grown. Gaps 31' of FIG. 6 define two rectangular regions on substrate 41 on which corresponding amplifiers 31 will be grown. Gaps 32' of FIG. 6 define two rectangular regions on substrate 41 on which corresponding portions of beam splitter 32 will be grown. Similar masking strips 51 are placed on substrate 41 in a similar manner to define the other portions of signal processor 20, including phase shifters 33.

As mentioned above, while all such gaps, e.g., gaps 30', 31' and 32' of FIG. 6, have a common width (d), the fabricator varies the width (w) of masking strips 51 to vary the nature of the layered structure 40 that is to be grown within the particular gap. FIG. 5 illustrates a typical cross section of a layered semiconductor structure that was grown with the use of masking strips 51. As seen in FIG. 5, no material grows on masking strips 51 during selective epitaxial growth. However, semiconductor material does grow on the un-masked surfaces of substrate 41. The presence of masking strips 51 during epitaxial growth significantly effects the growth rate and shape of the semiconductor layers for the material grown immediately adjacent thereto. Masking strips 51 also effect the material composition of the adjacent semiconductor layers. As is well know by those skilled in these arts, size, shape and material composition, as well as other growth condition factors, will usually determine the resulting band-gap configuration of an epitaxially grown layered structure.

Figure 7:
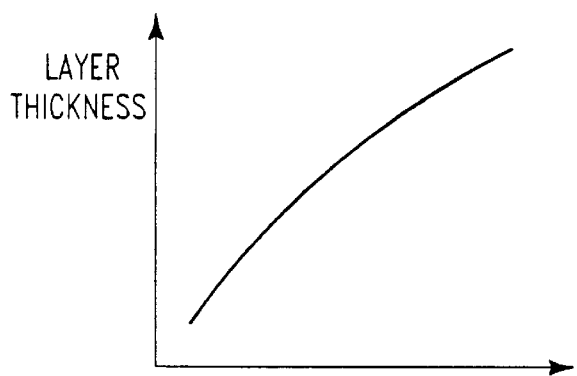
FIG. 7 is a graph of layer thickness vs. strip width useful in understanding the fabrication process of the present invention.

FIG. 7 graphically illustrates how the width (w) of masking strip 51 effects the layer thicknesses for layered structure 40 (see FIG. 5). Likewise, FIG. 8 graphically illustrates how the width (w) of masking strip 51 effects the In mole fraction for the InGaAsP layer.

Figure 8:
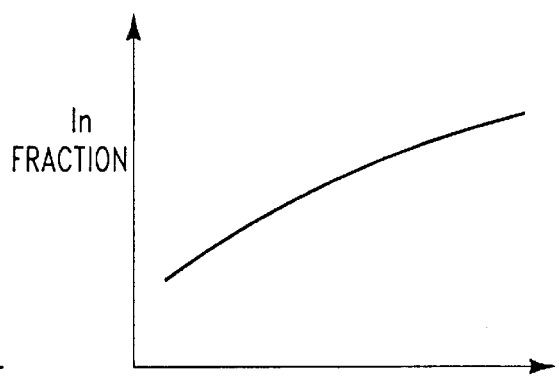
FIG. 8 is a graph of indium (In) fraction vs. strip width useful in understanding the fabrication process of the present invention.

As shown in FIGS. 7 and 8, the $In_xGa_{1-x}P_yAs_{1-y}$ quantum well layers 43 will have increased well width and In fraction as the width (w) of masking strips 51 increases, which results in a decreased quantum well band gap due to a reduction in quantum confinement energy and increased In fraction. However, for the InP material of barrier layers 42, the In fraction does not change due to a wider masking strip 51. Thus, using selective epitaxial growth, the fabricator tailors the band-gap profile of the waveguide devices of signal processor 20 by simply controlling the widths (w) of masking strips 51.

For the particular materials shown in the FIG. 4 illustrative example, the $In_xGa_{1-x}P_yAs_{1-y}$ well layers may be grown with (43%<x<63%, 0<y<0.4) such that their quantum well band gaps are about 0.8 electron volts (eV) or 1.55 micrometers ($\mu$m) with some compressive strain in those regions designated as phase shifters 33 and amplifiers 31. InP material is used to fabricate for barrier layers 42 because the average effective optical index of the well layers 43 in the MQW structure is bigger than that of top cladding layer 44 and the bottom InP cladding layer, viz., substrate 41. Alternatively, barrier layers 42 may be fabricated as lattice matched InGaPAs barriers with a band gap of about 1.1 eV. As an alternative to providing a P+ cap layer 45, the p-type doping of layered structure 40 may also be formed by p-type doping cap layer 45 and top cladding layer 44 such that the doping gradually varies from being P+ on the top surface of cap layer 45 to being un-doped at the MQW interface between cladding layer 44 and the top well layer 43.

As an illustrative example in which the operating wavelength is about 1.55 $\mu$m, those masking strips 51 that form beam splitters 30 and 32 have very narrow widths (w) ranging from zero to 2.5 $\mu$m. As such, the corresponding beam splitters 30 and 32 will have very narrow quantum wells of about 20–50 angstroms (Å) with a small In composition, producing a band-gap energy much greater than the operation wavelength and with some small tensile strain in the well. Thus, beam splitters 30 and 32 will be transparent to the propagating light and have substantially no light absorption therein.

Continuing with the illustrative example, the width (w) for those masking strips 51 that form phase shifters 33 are wider, e.g., 5 $\mu$m to 15 $\mu$m, producing a wider quantum well layer 43 of from 70 Å–100 Å with compressive strain. In this case, the band gap is about 20 meV–40 meV, higher than the operating light energy. Consequently, phase shifters 33 can produce an effective polarization dependent phase shifting with the application of a reverse bias, beam steering voltage ($v_i$), due to the quantum confined Stark effect and larger heavy- and light-hole separation by both quantum confinement and strain.

Still further, the width (w) of those masking strips 51 that form amplifiers 31 are even larger than those that form phase shifters 33. The resulting thicker well layers 43 with richer In compositions decreases the band gap to a value just below the 1.55 $\mu$m wavelength of the operating light energy. Thus, light intensity amplification can be achieved by current injection upon the application of a forward bias voltage 29 to amplifiers 31. The optical gain will be polarization dependent due to the strain and quantum confinement. In particular, there will be more gain for the TE mode for the system.

Consequently, the optical waveguide phase shifters 33 have enhanced polarization selectivity due to the compressive strained quantum wells. This represents an improvement over existing phase shifters, which normally do not have enough polarization selectivity for near band-gap operation. Additionally, since the present fabrication process comprises a single selective epitaxial growth step, the resulting structure can be of high quality. The present one-step fabrication process, having no intermediate regrowth steps, is simple and inexpensive, producing monolithically integrated structures of high quality with less impurities. The regulating layered compositions of structure 40 reduces strain in most materials, e.g., thick cladding layers and barriers, and keeps most tensile and compressive strains in the thin quantum well layers 43, which should not exceed the critical thickness. As mentioned above, these strains help produce the necessary polarization selectivity. Consequently, the present fabrication technique can produce monolithically integrated signal processor 20 as an inexpensive, small-sized structure that eliminates many of the prior art problems caused by the low efficiency of existing chip-to-chip interconnections and the unwanted impurities produced during existing integration by regrowth techniques.

Obviously many modifications and variations of the present invention are possible in light of the above teachings. For example, while signal processor 20 of FIG. 3 has a relatively small number of waveguide devices, for illustrative purposes, a more practical application of the present invention would involve a signal processor with hundreds or thousands of waveguide devices. In some applications, several sets of amplifiers 31, placed at different beam splitting stages, might be necessary. Also, in other applications, amplifiers 31 and phase shifters 33 may be moved from the linear portions of the waveguide network to the curved and/or Y-shaped sections of beam splitters 30 and 32. Also, semiconductor materials other than those recited herein may also be used. For example, InP cap layer 45 may be replaced with a p-type, lattice matched layer of indium-aluminum-arsenide. Still further, the epitaxially grown material of layered structure 40, within the gap of the two oxide masking strips 51, may be tailored and/or etched to support various modes of waveguide operation. For example, the upper portion of layered structure 40 may be etched to a predetermined depth, thereby narrowing the width of the upper portion of layered structure 40, for single mode light propagation. It is to be understood, therefore, that within the scope of the appended claims, the invention may be practiced otherwise than as specifically described.

What is claimed is:

1. An optical waveguide for processing light signals, comprising:
   a semiconductor substrate;
   a network of interconnected optical waveguide devices fabricated on said substrate using a single selective epitaxial growth process, said optical waveguide devices including optical beam splitters, optical amplifiers and optical phase shifters, with each optical waveguide device being fabricated in a gap of uniform width between masking strips and having the nature thereof determined by the width of the masking strips;

gain control means for amplifying said light signals propagating through said optical amplifiers; and phase-shift control means for controlling the relative phases of said light signals.

2. The optical waveguide of claim 1 wherein said substrate is a heavily doped layer and said optical waveguide devices each include multiple quantum well structures.

3. The optical waveguide of claim 2 wherein said multiple quantum well structures include a series of barrier and quantum well layers.

4. The optical waveguide of claim 3 further including a top cladding layer and a heavily doped cap layer mounted on said series of barrier and quantum well layers, said substrate and said cap layer being doped with charge carriers of opposite polarity.

5. The optical waveguide of claim 4 wherein said quantum well layers of said optical beam splitters have a band-gap energy that is much greater than the energy of said light signals.

6. The optical waveguide of claim 5 wherein said quantum well layers of said phase shifters have a band-gap energy that is greater than the energy of said light signals and said phase shifters are polarization selective relation to phase shifters in another optical waveguide.

7. The optical waveguide of claim 6 wherein said quantum well layers of said amplifiers have a band-gap energy that is smaller than the energy of said light signals and said amplifiers are polarization selective relation to amplifiers in another optical waveguide.

8. The optical waveguide of claim 7 wherein said substrate comprises n-type indium-phosphorous (InP), said barrier layers and said top cladding layer comprise un-doped InP, said cap layers include p-type InP, and said quantum well layers include un-doped indium-gallium-phosphate-arsenide.

9. The optical waveguide of claim 8 wherein said cap layers of said optical amplifiers and said optical phase shifters have metal layers deposited thereon, and said gain control means connects to said metal layers of said optical amplifiers and said phase-shift control means connects to said metal layers of said phase shifters.

* * * * *